Nov. 6, 1962 R. T. LA PORTE 3,062,256
TUBELESS TIRES
Filed Feb. 10, 1958
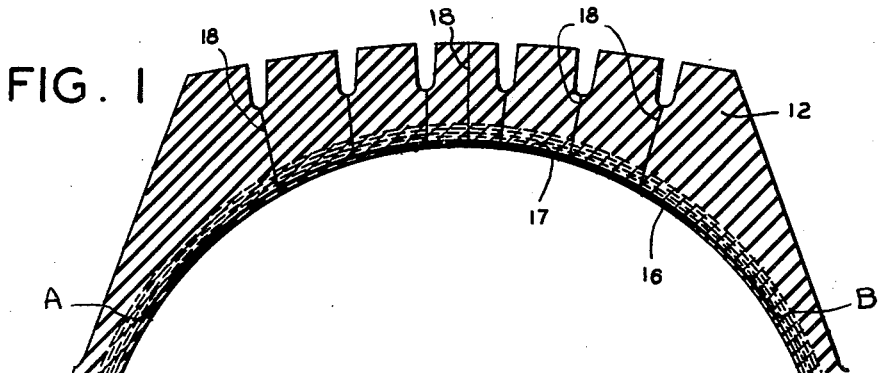
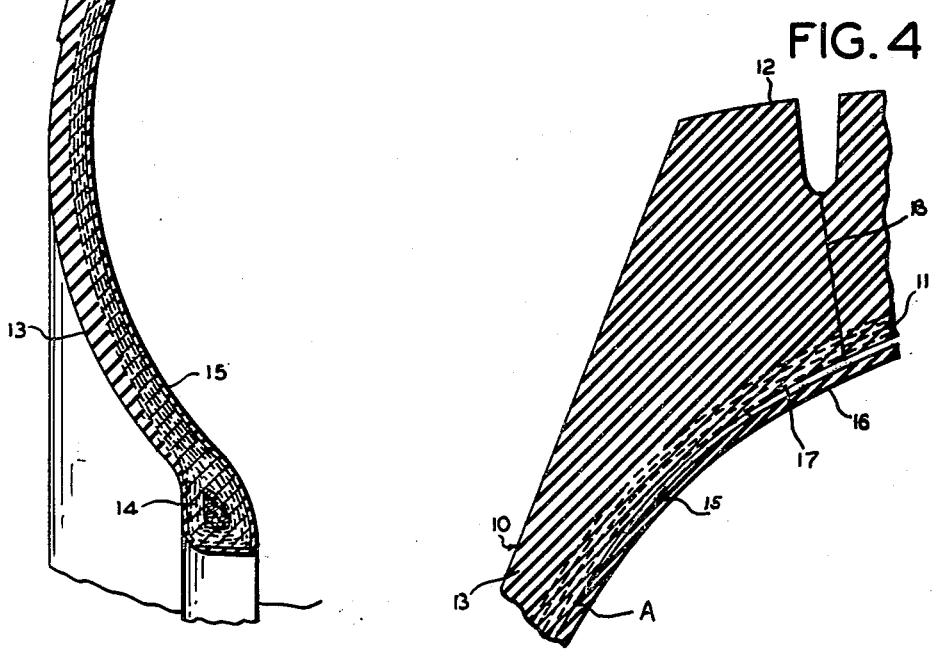
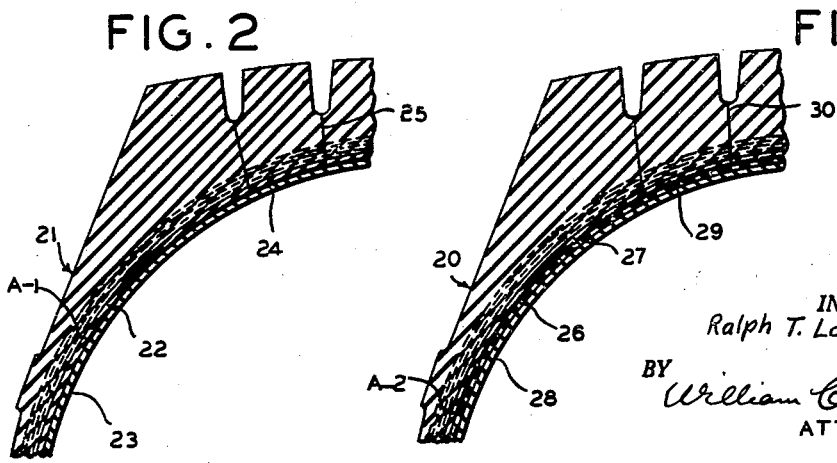
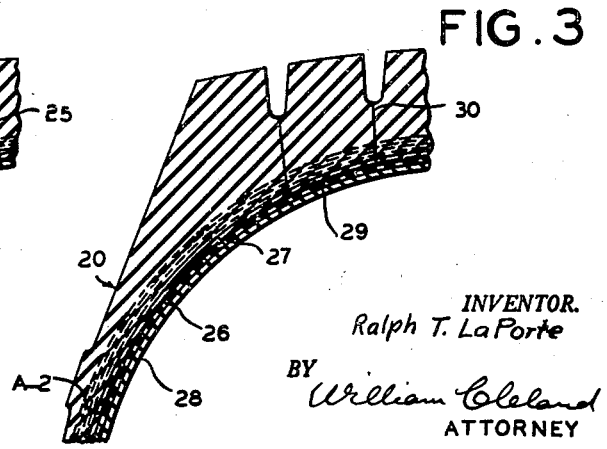
INVENTOR.
Ralph T. LaPorte
BY William Cleland
ATTORNEY

United States Patent Office 3,062,256
Patented Nov. 6, 1962

3,062,256
TUBELESS TIRES
Ralph T. La Porte, Copley, Ohio, assignor to Seiberling Rubber Company, Akron, Ohio, a corporation of Delaware
Filed Feb. 10, 1958, Ser. No. 714,167
7 Claims. (Cl. 152—330)

This invention relates to tubeless tires.

Heretofore, tubeless tires have been provided with an inner liner of air-impervious elastic material, generally of butyl-type rubber, for the purpose of preventing diffusion of pressure air through the relatively more porous fabric-reinforced rubber tire casing. It has been found, however, that a high percentage of tubeless tires fail because of tread separation, resulting from a gradual build-up of air in and around the tire fabric cords. This is, to a large extent, due to the fact that no perfect air-impervious liner material has been found. Because the liner was integrally vulcanized to the innermost fabric ply of the tire casing, from bead to bead, the air which penetrated through the liner could only diffuse into the carcass material, and in time the accumulated air would, at room temperature, approach the actual inflation pressure of the tire. When such a tire, at room temperature, was placed in motion on a vehicle and warmed up to operating temperature, the trapped air surrounding the fabric cords tended to increase in pressure to a point where it, in effect, separated the rubber coating from the cords and weakened the bond with the rubber of the casing, thereby resulting in ultimate tire failure. In a tire having an inflation pressure of 24 lbs. at a temperature of 70° F. under normal road-operating conditions, the pressure of the trapped air around the cords would be increased about 25% as the air is warmed up to about 200° F. It is believed that these conditions are the reason for the basic deficiency in present day tubeless tires, which will not be overcome entirely until a completely air-impervious liner stock is developed.

One object of the present invention is to provide an improved tubeless tire having a so-called air-impervious inner liner incorporated therein, including means adapted to prevent outwardly diffused tire-inflation air from accumulating in the wall of the tire, and thereby to eliminate the problem of tire failure due to tread separation.

Another object of the invention is to provide an improved tubeless tire of the character described, which has the advantage and convenience of a conventional tubeless tire with reference to mounting the same on a wheel rim, while having the added convenience corresponding to that of a tire and tube combination as to repair of punctures, as by application of a cold patch of known type to the liner.

These and other objects of the invention will be manifest from the following brief description and the accompanying drawings.

Of the accompanying drawings:

FIGURE 1 is a cross-section of a tubeless tire, embodying the improved air impervious liner of the invention therein.

FIGURES 2 and 3 are fragmentary cross-sections, corresponding in part to FIGURE 1, but illustrating two modified forms of the invention.

FIGURE 4 is an enlarged fragmentary cross-section, corresponding to the upper left hand corner of FIGURE 1.

Referring particularly to FIGURE 1 of the drawings, the numeral 10 designates a tubeless pneumatic tire of known general type, including a casing 11 of rubber and reinforcing rubberized fabric, having the usual crown or tread portion 12 and opposite sidewalls 13, 13, terminating in wire reinforced bead portions 14, 14 adapted to be received in air sealing relation in annular seats of a drop center type rim (not shown).

For preventing outward diffusion of inflation air through the tire casing 11, the same may be provided with a thin inner liner 15 of air-impervious elastic material, such as butyl-type rubber, extending from bead to bead, as shown. The liner 15, however, is integrally vulcanized only to the lower portion of the sidewalls 13, so that the crown portion of the liner is not adhered to the casing. In other words, the liner is suitably treated prior to vulcanization of the casing 11 to prevent adherence of the crown portion of the liner to the casing between laterally opposite points indicated at A and B, thereby providing an annular crown portion 16 of the liner which, while conforming snugly to the surface of the tire casing, defines an annular pocket, indicated by a heavy line 17 between the points A and B in FIGURE 1, and by exaggerated clearance in FIGURE 4. Extending from the exterior of the casing to communicate with the pocket 17 may be one or more vent means, such as a plurality of continuous perforations 18, 18. (See FIGURE 4.) The perforations are made substantially without removal of rubber from the casing, but are of sufficient size to permit diffusion of pressurized air through the casing from the annular pocket.

In use of the tire 10 on a vehicle wheel in service, pressure air which over a period of time may diffuse through the liner 15 will first tend to accumulate in the pocket 17, but will be diffused outwardly of the tire through vent perforations 18. That is, all air diffused through the liner 15 will be constantly vented outwardly of the casing, without accumulating to the extent which would cause ply failure in the manner previously described in connection with conventional tubeless tires.

FIGURE 2 illustrates a modified form of the invention adapted to provide maximum bruise resistance, wherein tire casing 21, similar to casing 10, has an inner layer 22 of rubber vulcanized to the inner surface of the innermost ply of rubberized fabric, completely around the entire inner surface of the casing. Attached to the rubber layer 22, as by vulcanization, may be a liner 23 of air impervious elastic material, such as butyl-type rubber, except in the crown area between laterally opposite points, one of which is indicated at A–1, to provide a non-adhered area between the layers 22 and 23, and defining an annular pocket 24 of substantial width. Perforations 25 extending from the exterior of the casing to the pocket 24 vent inflation air which may be diffused through the inner liner 23, in a manner and for the purposes previously described in connection with FIGURE 1.

FIGURE 3 shows another modified form of the invention which is substantially like the form of the invention shown in FIGURE 2, except that a relatively inextensible layer of either fabric or wire-reinforced material 26 may be interposed between an inner rubber layer 27 and an air-impervious liner 28, corresponding to the layers 22 and 23, respectively, of FIGURE 2. An annular air-diffusing pocket 29 extends around the crown portion of the tire between laterally opposite points, one of which is indicated at A–2, and perforations 30 are provided to vent diffused air from the pocket 29.

Modifications of the invention may be resorted to without departing from the spirit thereof or the scope of the appended claims.

What is claimed is:

1. A vulcanized tubeless pneumatic tire, comprising a casing of reinforced vulcanized elastic material and including crown and sidewall portions terminating in annular beads, said casing having an inner liner of air-impervious elastic material extending from bead-to-bead and snugly conformed to the inner wall portions by vulcanization and adapted to retain internal pressure air with a minimum of outward diffusion, said liner being integrally vulcanized to the elastic material of the bead and sidewall portions leaving a substantial area completely around said crown portion which is unattached to the casing to define closed pocket means peripherally around said crown portion in which any air that may be diffused through said liner may accumulate, the portion of the elastic material of the liner forming the pockets conforming snugly to the inner surface of the crown portion of the tire casing, said casing having a plurality of vent passages therethrough at the crown portion communicating all portions of said pocket means with the casing exterior, whereby pressure air which is diffused through said liner into said pocket means may escape outwardly through said vent passages, said passages being perforations made without substantial removal of elastic material of the casing.

2. A pneumatic tire as set forth in claim 1, said liner having incorporated therein relatively inextensible reinforcing means.

3. A pneumatic tire as set forth in claim 2, said inextensible reinforcing means including at least one ply of woven material.

4. A pneumatic tire as set forth in claim 3, said at least one ply being textile material.

5. A pneumatic tire as set forth in claim 1, said liner having incorporated therein a network of wire elements.

6. A vulcanized pneumatic tire, comprising a casing of reinforced vulcanized elastic material and including crown and sidewall portions terminating in annular beads, said casing having an inner liner of air-impervious elastic material extending from bead-to-bead and snugly conformed to the inner wall portions of the casing by vulcanization and being integrally vulcanized to the elastic material of the sidewall and bead portions of the casing leaving a substantial area of the liner completely around the crown portion thereof detached from the casing surface to define a closed annular pocket between the otherwise contacting surfaces of the liner and casing in which air that may be diffused through said liner may accumulate, the elastic material of the liner forming the pockets conforming snugly to the inner surface of the crown portion of the casing, said casing having a multiplicity of continuous perforations extending therethrough from the casing exterior and communicating with all portions of said pocket, whereby pressure air which is diffused outwardly through said liner into said pocket may escape outwardly through said perforations.

7. A pneumatic tire as set forth in claim 6, said liner including a plurality of layers of flexible material, at least one of which layers is substantially air-impervious, the outermost said layer being integrally bonded to said casing.

References Cited in the file of this patent

UNITED STATES PATENTS

| | | |
|---|---|---|
| 2,007,825 | Day | July 9, 1935 |
| 2,237,245 | Wilson et al. | Apr. 1, 1941 |
| 2,244,941 | Degnon | June 10, 1941 |
| 2,698,042 | Perkins | Dec. 28, 1954 |
| 2,699,811 | Trautman | Jan. 18, 1955 |
| 2,770,282 | Herzegh | Nov. 13, 1956 |
| 2,779,386 | Waters | Jan. 29, 1957 |
| 2,839,118 | Gramelspacher | June 17, 1958 |
| 2,917,096 | Snyder | Dec. 15, 1959 |